United States Patent
Albright et al.

(10) Patent No.: US 11,364,434 B2
(45) Date of Patent: Jun. 21, 2022

(54) USING TOUCH SENSING TO MAKE A TRACKBALL BEHAVE LIKE A JOYSTICK

(71) Applicant: Nvidia Corporation, Santa Clara, CA (US)

(72) Inventors: Ryan Albright, Santa Clara, CA (US); Ben Goska, Santa Clara, CA (US); Manoj Khanal, Santa Clara, CA (US); Kiril Stoynov, Santa Clara, CA (US); Jordan Levy, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 161 days.

(21) Appl. No.: 16/513,040

(22) Filed: Jul. 16, 2019

(65) Prior Publication Data

US 2021/0016161 A1   Jan. 21, 2021

(51) Int. Cl.
*A63F 13/24* (2014.01)
*G06F 3/0354* (2013.01)
*G06F 3/03* (2006.01)
*G06F 3/0338* (2013.01)
*A63F 13/214* (2014.01)
*A63F 13/22* (2014.01)
*G06F 3/02* (2006.01)

(52) U.S. Cl.
CPC ............ *A63F 13/24* (2014.09); *A63F 13/214* (2014.09); *A63F 13/22* (2014.09); *G06F 3/02* (2013.01); *G06F 3/0312* (2013.01); *G06F 3/0338* (2013.01); *G06F 3/03549* (2013.01); A63F 2300/1018 (2013.01); A63F 2300/1043 (2013.01); A63F 2300/1068 (2013.01)

(58) Field of Classification Search
CPC ........ A63F 13/24; A63F 13/214; A63F 13/22; A63F 2300/1068; A63F 2300/1018; A63F 2300/1043; G06F 3/03549; G06F 3/0312; G06F 3/0338; G06F 3/02
See application file for complete search history.

(56) References Cited

U.S. PATENT DOCUMENTS

| | | | | |
|---|---|---|---|---|
| 5,632,679 A | * | 5/1997 | Tremmel | H03K 17/9645 463/36 |
| 2014/0002362 A1 | * | 1/2014 | Srivastava | G06F 3/0362 345/167 |
| 2014/0274231 A1 | * | 9/2014 | De Luis | H01Q 7/00 455/575.7 |
| 2016/0283078 A1 | * | 9/2016 | Lin | G06F 3/0488 |
| 2018/0104574 A1 | * | 4/2018 | Tager | A63F 13/20 |

* cited by examiner

*Primary Examiner* — Jasson H Yoo (57) ABSTRACT

While one type of input, either a mouse input or a joystick input, may be preferred for one type of a game, it may not be preferred, or even compatible, for another type of a game. Introduced herein is a game controller that employs a dedicated input, which is capable of the absolute accuracy of a mouse input or trackball input, but is also capable of measuring how far off center the input is (e.g., how far off center it has moved), and can also return to center when released, as is present in a joystick input. The introduced game controller integrates a touch sensing trackball to enjoy the benefits of both the mouse type input and joystick type input, in a single dedicated input, providing a user freedom to play any type of game without worrying about the compatibility of their game controllers.

20 Claims, 5 Drawing Sheets

USING TOUCH SENSING TO MAKE A TRACKBALL BEHAVE LIKE A JOYSTICK

TECHNICAL FIELD

This application is directed, in general, to a game controller and, more specifically, to a game controller including a touch sensing trackball.

BACKGROUND

Video games have become an increasingly popular form of entertainment. Typically, video games are played on either a computer system, which employs a mouse and a keypad for control thereof, or a gaming system, which employs a handheld game controller having multiple buttons and/or joysticks. Each control method has different advantages and/or drawbacks over the other. For instance, a mouse input (e.g., as might be used with a computer system) provides relative movement to a video game by reporting incremental movement in a particular direction, and is particularly useful for video games requiring absolute accuracy and precise positioning. On the other hand, a joystick input (e.g., as might be used with a gaming system) provides a video game with absolute offset from center information, and is useful for video games requiring "velocity control," for example where the more offset from center the joystick there is, the faster a cursor or camera in a video game will move in that direction.

Due to these distinct characteristics, mouse and joystick inputs are preferred for different types of video games. What is needed in the art, is a controller for use with a video game that brings together the benefits of mouse inputs and joystick inputs in a single unit.

SUMMARY

One aspect provides a game controller. The game controller comprises a housing; a trackball rotatably retained within the housing; a motion sensor located within the housing and configured to detect a rotation of the trackball and determine, based on the rotation, an offset value of the trackball from a reference point; a touch sensor located within the housing and configured to reset the offset value to zero when the trackball is not being physically touched by a user; and a processor located within the housing and configured to generate a simulated joystick input using the offset value.

Another aspect provides a method for playing a game. The method comprises detecting a rotation of a trackball retained within a housing of a game controller; determining, based on the rotation, an offset value of the trackball from a reference point; generating a simulated joystick input using the offset value; and resetting, using a touch sensor of the game controller, the offset value to zero when the trackball is not being physically touched by a user.

BRIEF DESCRIPTION

Reference is now made to the following descriptions taken in conjunction with the accompanying drawings, in which.

DETAILED DESCRIPTION

While one type of input, either a mouse input or a joystick input, may be preferred for one type of a game, it may not be preferred, or even compatible, for another type of a game. For instance, while a mouse input is preferred in first-person perspective (FPS) or real-time strategy (RTS) types of video games for its absolute accuracy and precise positioning, it is generally less than ideal for sports, driving/racing, and flying types of games, as it lacks velocity control. Moreover, for some games, a mouse input is not even accepted. In contrast, joystick inputs thrive for types of video games where center offset is desired, such as the aforementioned sports, driving/racing, and flying types of games. As such, what is needed is a game controller with a dedicated input that includes the strengths of both the mouse and joystick types of inputs, and hence provides a good gaming experience to a user regardless of the type of video games being played.

Introduced herein is a game controller that employs a dedicated input, which is capable of the absolute accuracy of a mouse input or trackball input, but is also capable of measuring how far off center the input is (e.g., how far off center it has moved), and can also return to center when released, as is present in a joystick input. The introduced game controller, in one embodiment, integrates a touch sensing trackball to enjoy the benefits of each of the mouse type input and joystick type input, in a single dedicated input. The introduced game controller has been developed based on an understanding that a trackball lends itself nicely to be integrated into a game controller due to its size and input restrictions, often requiring aiming with a single finger and/or thumb.

To produce a mouse type input, the introduced game controller operates the touch sensing trackball as conventionally employed in a trackball mouse. However, to produce a joystick type input, the introduced game controller uses the touching sensing function in the touch sensing trackball to mimic a joystick in a handheld game controller. For example, when the user touches and rolls the trackball, the introduced game controller determines a distance and a direction that the trackball has rotated between upper and lower bounds in each axis, as if the trackball were a joystick moving around within the socket. Nevertheless, when the user lifts off his/her finger and/or thumb (or stops touching) the touch sensing trackball, the introduced game controller "zeroes" or resets the distance and direction, as if a joystick has sprung back to the default center position.

The introduced game controller, in one embodiment, can be configured to switch between a trackball mouse mode and a joystick mode depending on the game being played. The switching may either be manual in nature, or automatic in nature. For example, the introduced game controller could automatically enable the touch sensing trackball as a trackball mouse input, or joystick input, depending on the type of input that the controller deems is best suitable for the specific game being played. Alternatively, the user could manually enable the touch sensing trackball as a trackball mouse input, or joystick input, depending on the type of input that the user deems is best suitable for the specific game being played. According to this embodiment, a switch could be located on the controller to toggle between the two different configurations.

The introduced game controller provides users freedom to play any type of game without worrying about the compatibility of their game controllers. By allowing the input type to be chosen, the introduced game controller provides the user with both absolute aiming accuracy and precise positioning of a mouse, and the velocity control of a joystick. Moreover, the introduced game controller provides more precise and accurate joystick input than the actual joystick input because it does not require a "dead-zone" around the default center position. The dead-zone is an unusable region around the default center position that is considered as centered to compensate for the high mechanical position error in the region. In the introduced game controller, this dead-zone is substantially, if not completely, eliminated as the simulated joystick centers itself instantaneously without any change in error across the surface of a trackball. Lastly, the introduced game controller is more ergonomic and versatile than a keyboard and a mouse as a trackball is rotated with only minimal wrist movement and is functional even when handheld.

Figure 1:
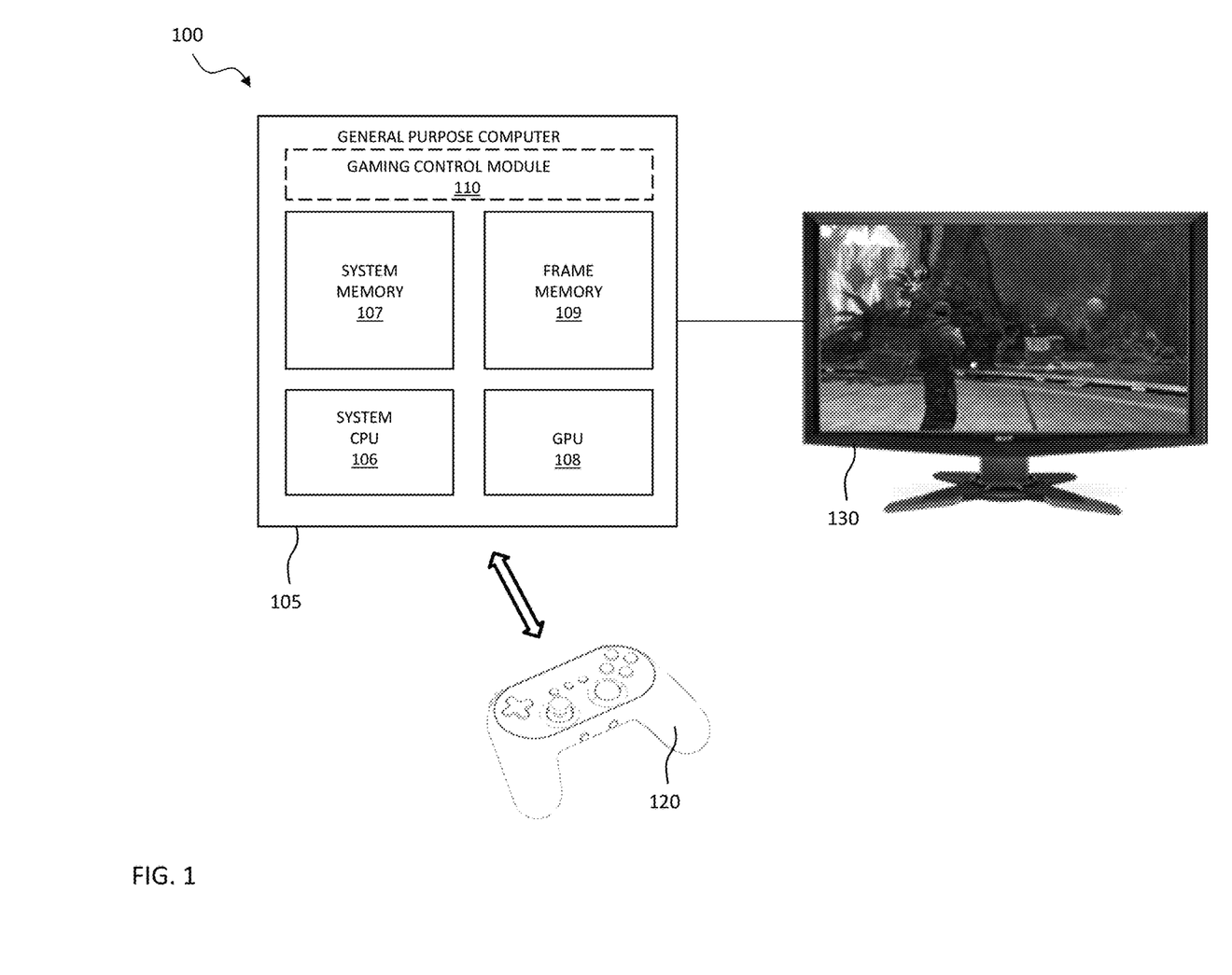
FIG. 1 is a block diagram of an embodiment of a gaming system including a game controller manufactured and designed according to the principles of the present disclosure.

FIG. 1 illustrates a block diagram of an embodiment of a gaming system, generally designated 100, constructed according to the principles of the disclosure. In the illustrated embodiment, the gaming system 100 includes a general purpose computer 105, e.g., a desktop computer, laptop computer, dedicated gaming console (e.g., NVIDIA's SHIELD TV), with a game controller 120 manufactured and designed according to the disclosure, and a monitor 130. While the general purpose computer 105, the game controller 120 and the monitor 130 are illustrated in FIG. 1 as three separate components, in an alternative embodiment of the disclosure two or more of the features could be embodied within a single contained unit. Moreover, while it is illustrated that the game controller 120 communicates with the general purpose computer 105 wirelessly, other embodiments exist where a wired connection is optional and/or necessary.

In the illustrated embodiment, the general purpose computer 105 includes a system central processing unit (CPU) 106, system memory 107, a graphics processing unit (GPU) 108 and frame memory 109. The general purpose computer 105 also includes a gaming control module 110. The system CPU 106 is coupled to the system memory 107 and the GPU 108, and provides general computing processes and control of operations for the general purpose computer 105. The system memory 107, in the illustrated embodiment, includes long term memory storage (e.g., a hard drive) for computer applications and random access memory (RAM) to facilitate computation by the system CPU 106. The GPU 108 is further coupled to the frame memory 109 and provides monitor display and frame control of the local monitor 130, among other tasks.

The gaming control module 110 is generally included in the general purpose computer 105, and in one embodiment is a software module that corresponds to software included with a video game or software that is independent of the video game. The gaming control module 110 may operationally reside in the system memory 107, the frame memory 109 or in portions of both.

Figure 2:
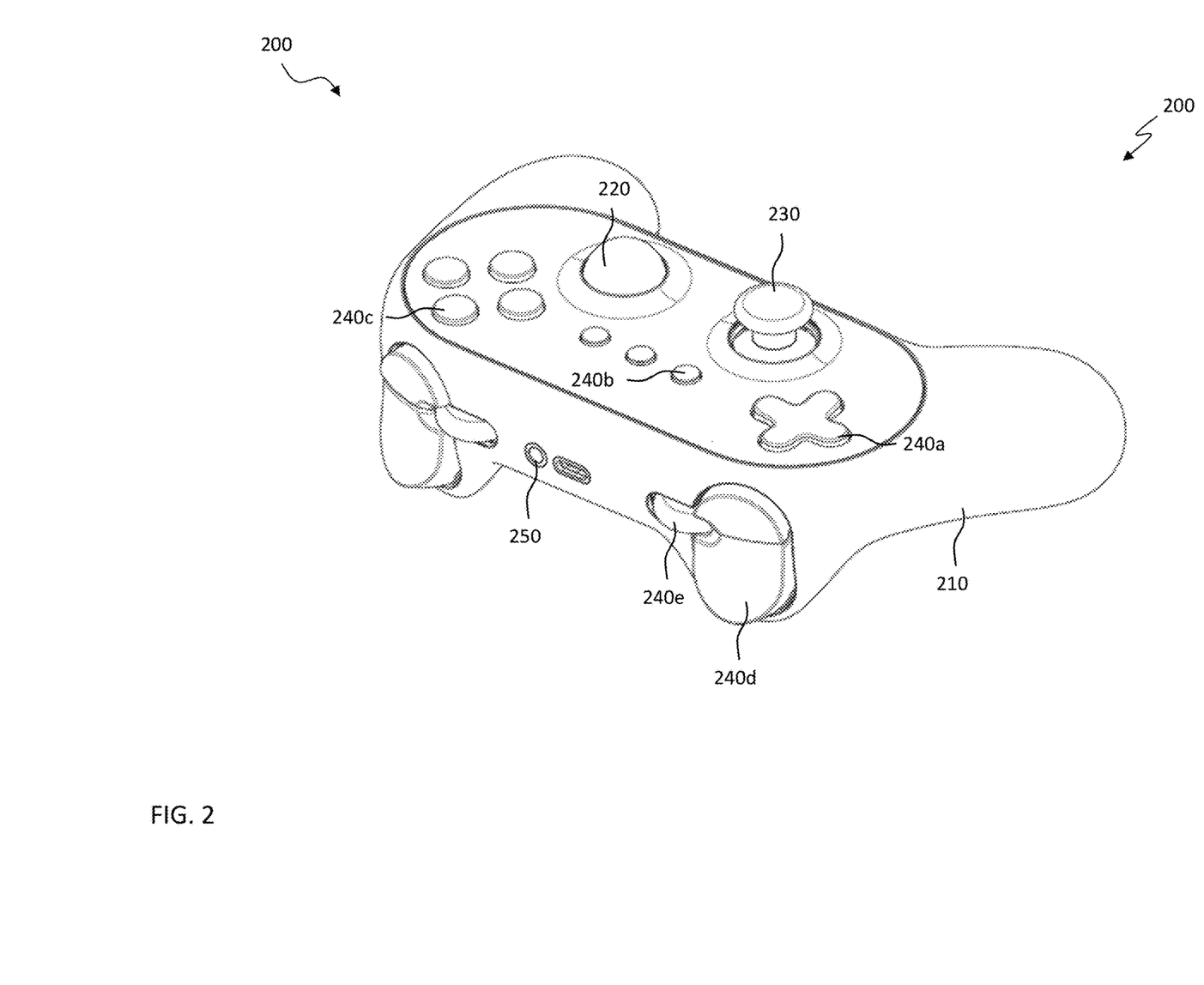
FIG. 2 is a perspective view of an embodiment of a touch sensing trackball game controller manufactured and designed according to the principles of the disclosure.

FIG. 2 illustrates a perspective view of an embodiment of a game controller 200 manufactured and designed according to the principles of the disclosure. The game controller 200, in one embodiment, corresponds to a game controller such as the game controller 120 in FIG. 1. In the illustrated embodiment, the game controller 200 includes a housing 210 constructed to retain a trackball 220 therein. In the illustrated embodiment of FIG. 2, the housing 210 is additionally constructed to include a joystick 230 (e.g., left joystick in the illustrated embodiment), additional buttons 240a-240e, and a RF transceiver 250 that may be communicatively connected to a general purpose computer, such as the general purpose computer 105 described above with respect to FIG. 1.

In the illustrated embodiment, the game controller 200 is configured to generate a simulated joystick input using the trackball 220. More specifically, the game controller 200 generates a simulated joystick input using an offset value of the trackball 220 from a reference point, which is determined based on the rotation of the trackball 220. As a standard joystick springs back to the center when released by a user, the game controller 200 also resets the offset value when the trackball 220 is not physically touched by the user. Using the RF transceiver 250, the game controller 200 transmits the simulated joystick input to the general purpose computer. Additional details of the game controller 200 are provided below with respect to FIG. 3.

Figure 3:
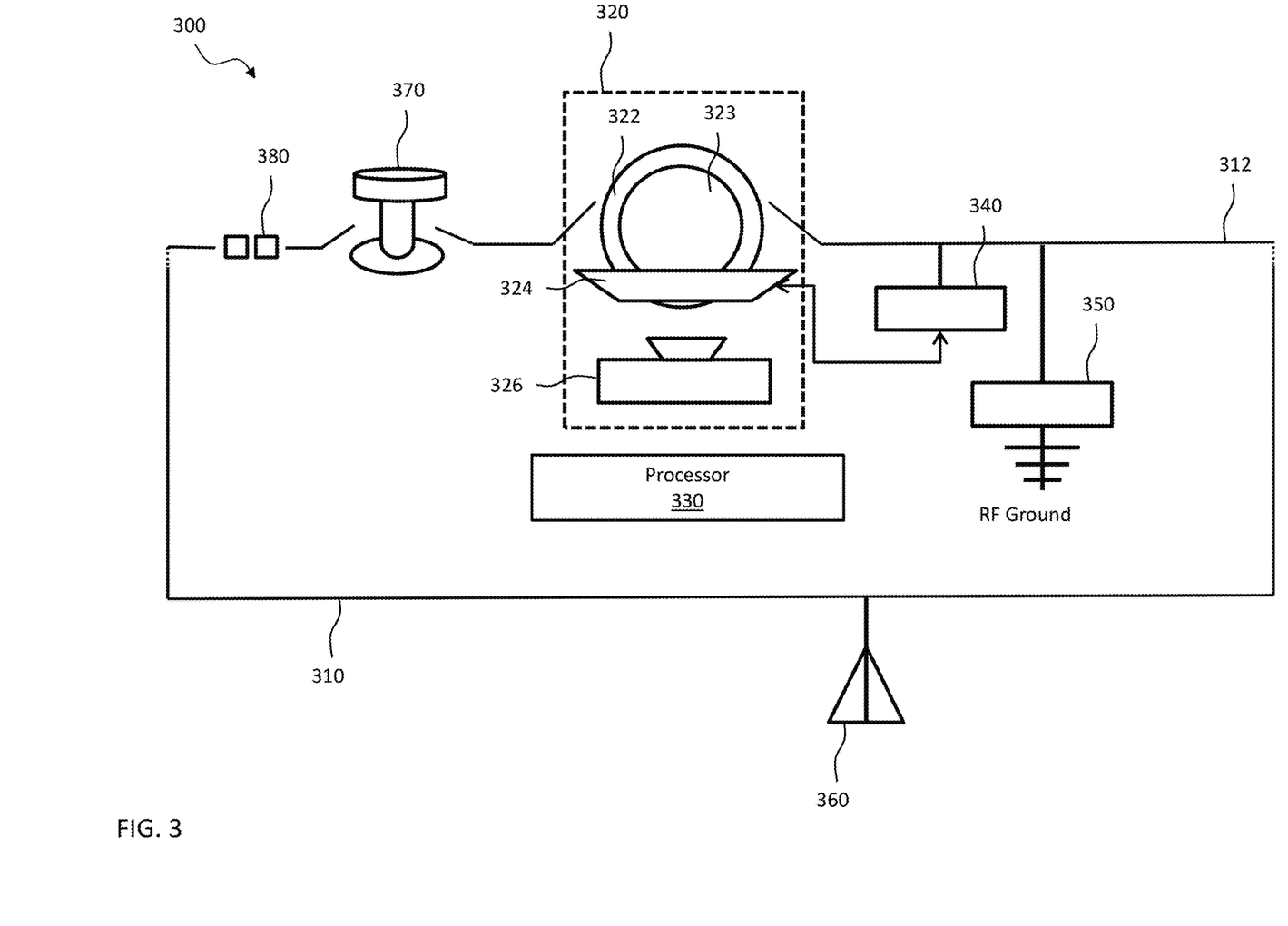
FIG. 3 is a block diagram of an alternative embodiment of a game controller manufactured and designed according to the principles of the present disclosure.

FIG. 3 illustrates a block diagram of an embodiment of a game controller 300 manufactured and designed according to the principles of the disclosure. The game controller 300 may be a game controller, such as the game controller 200 illustrated in FIG. 2. In accordance with the disclosure, the game controller 200 is coupled/paired to, or at least coupleable/pairable to, a general purpose computer. In the illustrated embodiment, the game controller 300 includes a housing 310, a trackball unit 320, a processor 330, a capacitive shield driver (CSD) 340, a filter 350, a RF transceiver 360, a standard joystick 370, and buttons 380, among other features neither illustrated nor discussed.

The housing 310 is configured to at least partially enclose the aforementioned components 320-380 of the game controller 300. As shown in FIG. 3, the housing 310 is designed to be ergonomic so that its user may wrap ones palms and/or fingers comfortably there around. The housing 310, in the illustrated embodiment, includes a faceplate 312. In accordance with one embodiment, the faceplate 312 is removable, and thus may be easily interchanged based upon a user's preferences. The housing 310, including the faceplate 312, may be made of non-conducive material such as plastic or made of conductive material such as metal or carbon fiber. In the illustrated embodiment, the faceplate 312 is a conductive faceplate made of metal or a metal alloy.

In the illustrated embodiment, the trackball unit 320 is at least partially contained within the housing 310. The trackball unit 320, as shown in the embodiment of FIG. 3, includes a trackball 322, a touch sensor 324 and a motion sensor 326, and is coupled to the processor 330 and the CSD 340. The trackball 322 is rotatably retained within the housing 310 by the faceplate 312. A portion of the trackball 322 is exposed such that it can be freely rotated by the user. In the illustrated embodiment, the trackball 322 includes a conductive core 323 that is configured to transfer a capacitive charge from the user, such as a finger of the user, to the touch sensor 324 when the user is physically touching the trackball 322. The conductive core 323 is a metal core in one embodiment.

The touch sensor 324 is located within the housing 310. In the illustrated embodiment, the touch sensor 324 is a capacitive sensor and is located between the trackball 322 and the motion sensor 326. The touch sensor 324 is not limited to a capacitive sensor and can be a different type of a touch sensor such as a pressure sensor, an inductive sensor, a resistive sensor, and a magnetic sensor, among others. The touch sensor 324 is configured to detect when the user is and is not physically touching the trackball 322. Accordingly, the information from the touch sensor 324 may be used to reset the offset value to zero when the user is no longer touching the trackball 322. This allows the trackball unit 320 to mimic the behavior of a joystick. In one embodiment, the trackball unit 320 includes a haptic feedback device that provides feedback to the user when the user no longer touches the trackball 322. The feedback may be in the form of vibration or force, among others.

In the illustrated embodiment, the touch sensor 324 is configured to detect when the user is physically touching the trackball 322, based upon the change in capacitance (e.g., change in the capacitive charge transferred from the conductive core 323). In an embodiment where the touch sensor 324 is a pressure sensor, the touch sensor 324 is configured to detect when the user is physically touching the trackball 322 based upon the change in the pressure exerted on the trackball 322. While a single trackball unit 320 has been illustrated for the game controller 300, and furthermore that the trackball 322 is located proximate a center of the housing 310, those skilled in the art appreciate that the number of trackball units 320 and location of said trackball units 320 may vary from that illustrated in FIG. 3.

The motion sensor 326 is located within the housing 310. In the illustrated embodiment, the motion sensor 326 is an optical sensor and is located proximate (e.g., beneath) the trackball 322. The motion sensor 326 is not limited to an optical sensor. Accordingly, the motion sensor 326 may be a collection of wheels that measure the relative movement of the trackball 322 in each of the x-axis and the y-axis. The motion sensor 326, in the illustrated embodiment, is configured to detect a rotation of the trackball 322 and determines an offset value of the trackball 322 from a reference/starting point based on the detected rotation. The motion sensor 326 is configured to determine the offset value by counting a number of offsets the trackball has rotated.

The processor 330, in the illustrated embodiment, is located within the housing 310. The processor 330 is configured to generate a simulated joystick input using the offset value obtained from the motion sensor 326. The processor 330, in one embodiment, is configured to generate the simulated joystick input by determining a direction and a distance the trackball 322 has rotated using the offset value and mapping the direction and the distance into X and Y coordinates using an X-Y coordinate system that has upper and lower bounds for each axis. In one embodiment, the X-Y coordinate system is scaled to effectively increase or decrease "sensitivity". The scaling may be linear or follow some other curve based on the user preference for any specific game. Although illustrated as separate components, the processor 330 and the motion sensor 326 may be embodied as a single unit.

The CSD 340 is located, in the illustrated embodiment, within the housing 310. The CSD 340 is configured to ideally negate a parasitic capacitance of the conductive faceplate 312 to the touch sensor 324 when the conductive faceplate 312 is attached to a capacitance source, e.g., when physically touched by a user. The CSD 340 negates the parasitic capacitance by driving both the conductive faceplate 312 and the touch sensor 324 with the same, reference capacitance using a source-follower. As the capacitances of both the touch sensor 324 and the conductive faceplate 312 follow the reference capacitance applied by the CSD 340, the touch sensor 324 becomes no longer affected by the parasitic capacitance and is able to correctly detect a change in the capacitance (with respect the reference capacitance) when the user is physically touching the trackball 322. Other parasitic capacitances that may be introduced to the touch sensor 324, e.g., by other conductive parts touching the conductive faceplate 312, may also be negated using the CSD 340. It is understood that for an embodiment that employs a non-conductive faceplate or a non-capacitive touch sensor, the CSD 340 may not be necessary.

The filter 350 is located within the housing 310 in one embodiment of the disclosure. The filter 350, in this embodiment, is configured to connect the conductive faceplate 312 to an RF ground to prevent the conductive faceplate 312 from turning into a floating conductor near the RF transceiver 360, which can cause RF attenuation. By connecting the conductive faceplate 312 to the RF ground, the filter 350 turns the conductive faceplate 312 (and also other conductive parts touching the conductive faceplate 312) into a reflector that improves the transmitting effectiveness of the RF transceiver. Furthermore, grounding the conductive faceplate 312 via the filter 350 effectively negates the parasitic capacitance of the conductive faceplate 312, as it places the trackball 322 in a self-capacitance mode. It is understood that for an embodiment that employs a non-conductive faceplate, the filter 350 may also not be necessary.

The RF transceiver 360 is located at least partially within the housing 310 in the embodiment of FIG. 3. The RF transceiver 360 is configured to transmit the inputs generated by the processor 330, the motion sensor 326, the joystick 370 and the buttons 380 to the connected gaming device, such as the general purpose computer 105 of FIG. 1. The RF transceiver 360 may communicate with the gaming device using a standard such as Bluetooth™, Zigbee® or Wi-Fi. As discussed above, certain embodiments may exist wherein the game controller 300 alternatively or additionally communicates with the general purpose computer 105 using a physical connection.

The joystick 370 (e.g., standard joystick) is pivotally retained within the housing 310. The joystick 370 pivots around as the user pivots the joystick 370 with his/her finger, and springs back to the default center position as the user releases the joystick 370. It is understood that the joystick 370, may be a counterpart of directional keys, e.g., W, S, A, D, in a keyboard or a directional pad of the game controller 300. While a single joystick 370 has been illustrated for the game controller 300, and furthermore that the joystick 370 is a left joystick, those skilled in the art appreciate that the number of joysticks 370 and location of said joysticks 370 may vary from that illustrated in FIG. 3.

The buttons 380 are retained within the housing 310. The buttons 380 are initiated when the user presses the buttons 380 with his/her finger. When the user lifts off his/her finger, the buttons 380 return to their original positions. The functions of the buttons 380 may be changed by mapping different functions to the buttons 380. In one embodiment, one or more of the buttons 380 may be used to activate/deactivate the trackball unit 320 from functioning like a joystick.

Figure 4:
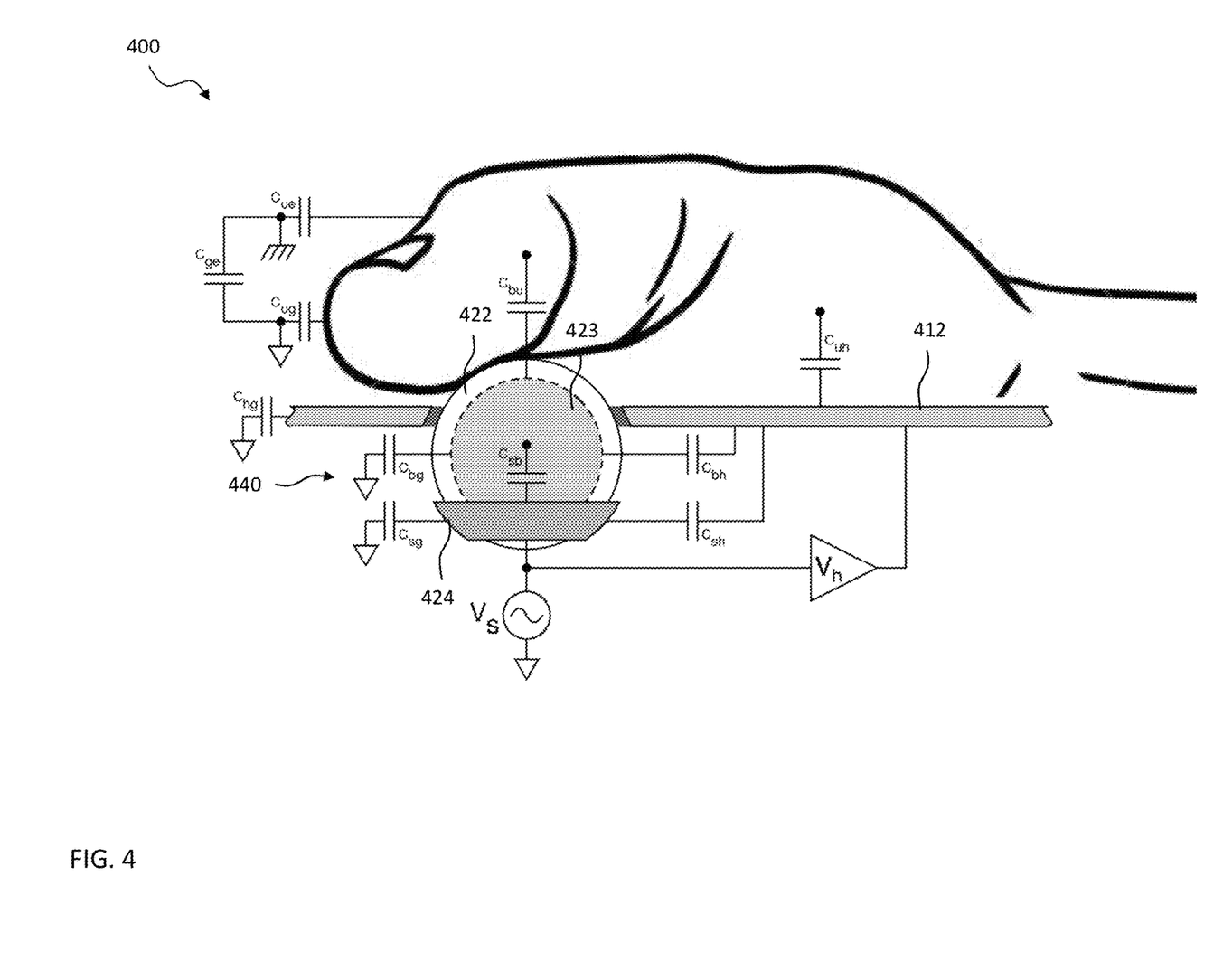
FIG. 4 is a schematic of an embodiment of a game controller manufactured and designed according to the principles of the disclosure.

FIG. 4 illustrates a schematic of an alternative embodiment of a game controller 400 manufactured and designed according to one or more principles of the disclosure. FIG. 4 illustrates one embodiment of how a CSD 440 of a game controller 400 constructed according to the principles of the disclosure negates parasitic capacitances. For clarity, only a faceplate 412, a trackball 422 with a conductive core 423, a capacitive touch sensor 424, and a CSD 440 are illustrated.

As described above, to negate a parasitic capacitance Cuh from the user touching the faceplate 412, the CSD 440 drives both the faceplate 412 and the capacitive sensor 424 with same capacitance. In the illustrated embodiment, the CSD 440 employs a voltage amplifier Vh to drive the faceplate 412 and the capacitive sensor 424 with the same capacitance.

In instances where Cuh is high and Cbh is much lower than Cuh, the faceplate 412 can be driven with a signal Vh, which is a source-follower of the sensed signal seen at Vs. This can be used to attenuate Csh, Cbh, and Cuh, making Cbu pass a stronger signal into Csb and making the touch of the trackball 422 more detectable. Cue, Cge, Cug represent a simplified human body model with respect to free space and ground. It is understood that Cue, Cug, Cge, Cgh, Cbg, Csg, Csh, and Cbh are considered static whereas the input vectors are Cbu and Cuh.

Figure 5:
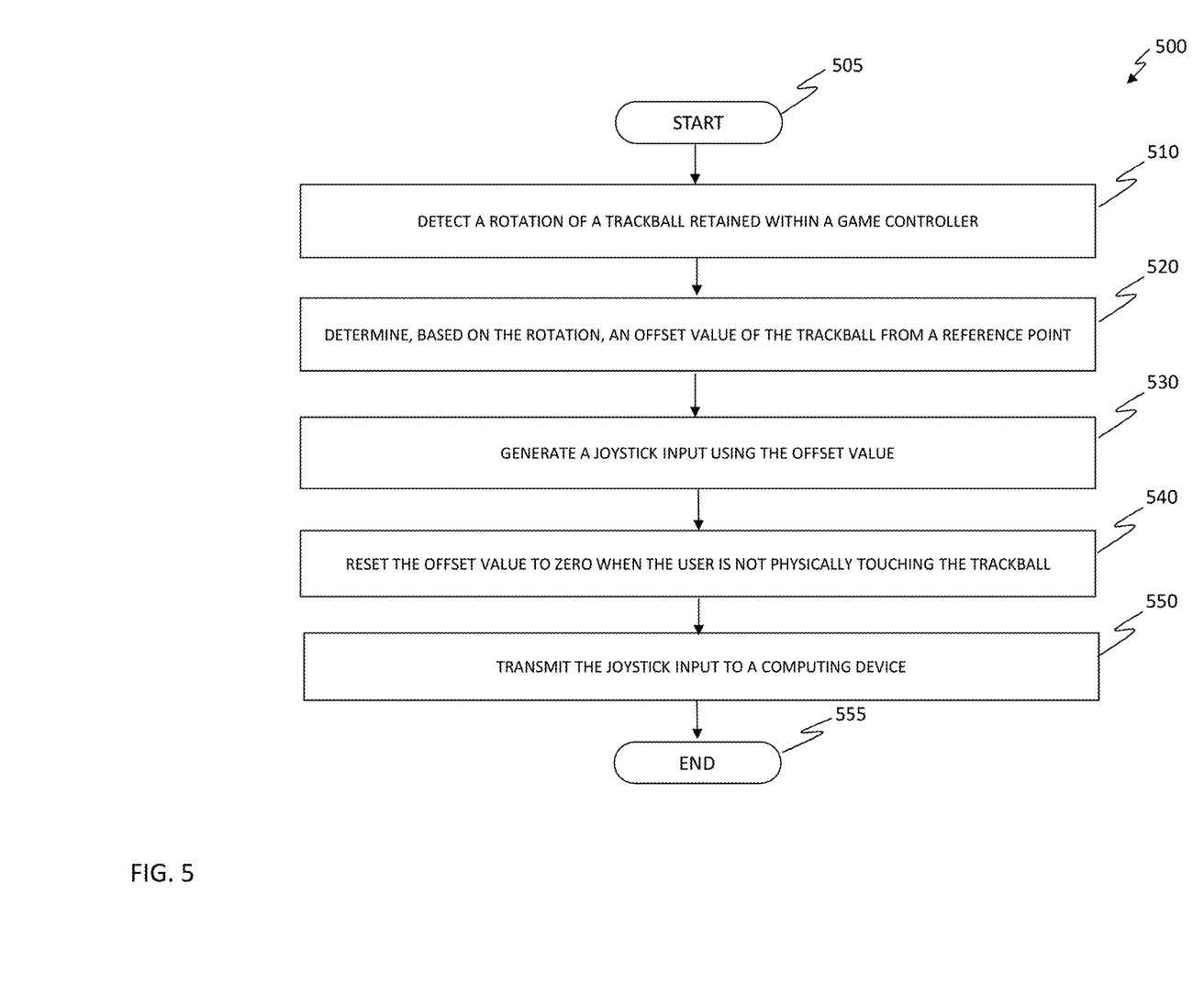
FIG. 5 is a flow diagram of an embodiment of a method for playing a game.

FIG. 5 illustrates a flow diagram of an embodiment of a method 500 for playing a game. The method 500 may be performed using a game controller such as one or more of the game controllers 200, 300, or 400 illustrated in FIGS. 2 to 4. The method 500 starts at step 505. Thereafter, in a step 510, a rotation of a trackball (e.g., the trackball retained within the game controller) is detected. The rotation of the trackball may be initiated by a user physically touching the trackball, and may be detected by a motion sensor in the game controller, such as motion sensor 326 of FIG. 3. In a step 520, an offset value of the trackball from a reference point is determined based on the rotation. The offset value may be determined by counting number of offsets the trackball has rotated using the motion sensor of the game controller.

Thereafter, in a step 530, a simulated joystick input is generated using the offset value determined at step 520. More specifically, the simulated joystick input is generated by determining a direction and a distance the trackball has rotated using the offset value and mapping the direction and the distance into X and Y coordinates using an X-Y coordinate system that has upper and lower bounds for each axis. The upper and lower bounds represent a range of motion a joystick would have. The step 530 may be performed using a processor in the game controller, such as processor 330 of FIG. 3, or by the motion sensor of the game controller. It should be noted that steps 510 to 530 are carried out while the user is touching the trackball of the game controller. As detailed above, a touch sensor, such as the touch sensor 324 illustrated in FIG. 3, may be used to sense the user physically touching the trackball. In one embodiment, the touch sensor is a capacitive sensor, and the detection is based on a capacitive charge transferred from the user via a conductive, e.g., metal, core inside the trackball, to the capacitive sensor. In another embodiment, the touch sensor is a pressure sensor, and the detection is based on a pressure exerted by the user on the trackball.

When the user lifts off his/her finger from the trackball, the offset value is reset to zero at step 540. This mimics the behavior of a joystick springing back to the default/center position when the user releases the joystick. At step 550, the generated simulated joystick input is transmitted to a general purpose computer, to which the game controller is connected. Along with the simulated joystick input, other inputs from the game controller, such as inputs from buttons and a traditional joystick, may also be transmitted to the general purpose computer. The step 550 may be performed using a Radio Frequency (RF) transceiver of the game controller, such as RF transceiver 360 of FIG. 3. When the game controller is connected to the general purpose computer via a wired connection, the simulated joystick input is transmitted via the wired connection. The method 500 ends at step 555.

In some instances, the game controller performing the method 500 may include a conductive, e.g., metal, faceplate. In such instances, touching the conductive faceplate can introduce a parasitic capacitance to the touch sensor, due to the faceplate's close proximity to the trackball. To negate this parasitic capacitance, the method 500 may further include a step of driving the conductive faceplate and the touch sensor with a same reference capacitance using a source-follower. As the capacitances of both the touch sensor and the conductive faceplate follow the reference capacitance applied, the parasitic capacitance no longer affects the touch sensor, and a change in the capacitance (with respect the reference capacitance) when the user is physically touching the trackball can be correctly detected. This additional step may be performed by a CSD, such as CSD 340 of FIG. 3.

In addition to the parasitic capacitance, the conductive faceplate can also cause RF attenuation and affect the performance of the RF transceiver carrying out step 550. To prevent this RF attenuation, the method 500 may further include a step of grounding the conductive faceplate by connecting the conductive faceplate to a RF ground via a filter, such as filter 350 of FIG. 3.

Those skilled in the art to which this application relates will appreciate that other and further additions, deletions, substitutions and modifications may be made to the described embodiments.

What is claimed is:

1. A game controller, comprising:
   a housing that includes a conductive faceplate;
   a trackball rotatably retained within the housing;
   a motion sensor, located within the housing, that detects a rotation of the trackball and determines, based on the rotation, an offset value of the trackball from a reference point;
   a touch sensor, located within the housing, that resets the offset value to zero when the touch sensor detects that a user is not physically touching the trackball, wherein the trackball includes a conductive core that transfers a capacitive charge from the user to the touch sensor when the user is physically touching the trackball;
   a processor, located within the housing, that simulates a displacement of a simulated joystick from a default center position and a return of the simulated joystick to the default center position based on a change in the offset value; and
   a capacitive shield driver that negates a parasitic capacitance of the conductive faceplate to the touch sensor when the user is physically touching the conductive faceplate.

2. The game controller of claim 1, wherein the touch sensor detects when the user is physically touching the trackball based on a change in the capacitive charge.

3. The game controller of claim 1, wherein the touch sensor detects when the user is not physically touching the trackball based on a change in the capacitive charge.

4. The game controller of claim 1, wherein the displacement is simulated by determining a direction and a distance the trackball has rotated using the offset value and mapping the direction and the distance into X and Y coordinates using an X-Y coordinate system that has upper and lower bounds for each axis.

5. The game controller of claim 1, wherein the capacitive shield driver negates the parasitic capacitance of the conductive faceplate by driving the conductive faceplate and the touch sensor with a reference capacitance using a source-follower.

6. The game controller of claim 1, wherein the conductive faceplate is connected to a RF ground via a filter.

7. The game controller of claim 1, wherein the housing includes a non-conductive faceplate.

8. The game controller of claim 1, wherein the motion sensor is an optical sensor located proximate the trackball.

9. The game controller of claim 1, wherein the touch sensor is a capacitive sensor located between the trackball and the motion sensor.

10. The game controller of claim 1, wherein the touch sensor is a pressure sensor located within the housing.

11. The game controller of claim 1 further comprising a plurality of buttons and a joystick that are mapped to keys in a keyboard.

12. The game controller of claim 1 further comprising a RF transceiver that is communicatively connected to a gaming device.

13. A method for playing a game, comprising:
  detecting a rotation of a trackball retained within a housing of a game controller;
  determining, based on the rotation, an offset value of the trackball from a reference point;
  resetting, using a touch sensor of the game controller, the offset value to zero when the touch sensor detects that a user is not physically touching the trackball, wherein the trackball includes a conductive core that transfers a capacitive charge from the user to the touch sensor when the user is physically touching the trackball;
  simulating a displacement of a simulated joystick from a default center position and a return of the simulated joystick to the default center position based on a change in the offset value; and
  negating a parasitic capacitance of a conductive faceplate in the housing to the touch sensor when the user is physically touching the conductive faceplate.

14. The method of claim 13 further comprising detecting when the user is physically touching the trackball based on a change in the capacitive charge.

15. The method of claim 13 further comprising detecting when the user is not physically touching the trackball based on a change in the capacitive charge.

16. The method of claim 13, wherein the simulating includes determining a direction and a distance the trackball has rotated using the offset value and mapping the direction and the distance into X and Y coordinates using an X-Y coordinate system that has upper and lower bounds for each axis.

17. The method of claim 13, wherein the negating includes driving the conductive faceplate and the touch sensor with a reference capacitance using a source-follower.

18. The method of claim 13, further comprising connecting the conductive faceplate to a RF ground via a filter.

19. The method of claim 13 further comprising transmitting an input of the user to a gaming device.

20. The method of claim 13 further comprising mapping a plurality of buttons and a joystick of the game controller to keys in a keyboard.

* * * * *